United States Patent [19]

Sado et al.

[11] 4,219,808

[45] Aug. 26, 1980

[54] NUMERICAL AND NON-NUMERICAL DISPLAY SYSTEM FOR A SMALL CALCULATOR

[75] Inventors: Ichiro Sado, Tokyo; Seiji Saito, Yokohama; Shigeru Matsuyama, Tokyo, all of Japan

[73] Assignee: Canon Kabushiki Kaisha, Tokyo, Japan

[21] Appl. No.: 932,339

[22] Filed: Aug. 9, 1978

Related U.S. Application Data

[63] Continuation of Ser. No. 744,442, Nov. 23, 1976, abandoned.

[30] Foreign Application Priority Data

Dec. 5, 1975 [JP] Japan ................................ 50-145556

[51] Int. Cl.[2] ............................ G06F 3/14; G09F 9/32

[52] U.S. Cl. .................................... 340/756; 340/762; 35/31 R

[58] Field of Search ........................ 340/756, 762, 765; 178/30; 35/5, 6, 9 R, 9 A, 30, 31 R, 31 A, 31 C; 58/152 R

[56] References Cited

U.S. PATENT DOCUMENTS

| | | | |
|---|---|---|---|
| 3,626,367 | 12/1969 | Howard et al. | 340/762 |
| 3,803,834 | 4/1974 | Reese | 35/31 R |
| 3,938,318 | 2/1976 | Collins | 340/765 |
| 3,947,976 | 4/1976 | Hafel | 35/31 C |
| 3,999,050 | 12/1976 | Pitroda | 58/152 R |
| 4,044,242 | 8/1977 | Laesser | 340/756 |

*Primary Examiner*—Marshall M. Curtis

*Attorney, Agent, or Firm*—Fitzpatrick, Cella, Harper & Scinto

[57] ABSTRACT

A numerical display system for use in a small calculator has a multi-digit numerical display device for selectively energizing a plurality of segments to display alphanumeric characters, first drive circuit for causing the numerical display device to display a denominator and a numerator at a time, and second drive circuit for causing a denominator-numerator distinction symbol to be displayed between the denominator and the numerator by the selective energization of the plurality of segments.

7 Claims, 5 Drawing Figures

NUMERICAL AND NON-NUMERICAL DISPLAY SYSTEM FOR A SMALL CALCULATOR

This is a continuation of application Ser. No. 744,442 filed Nov. 23, 1976 now abandoned.

BACKGROUND OF THE INVENTION

1. Filed of the Invention

This invention relates to a numerical display system for a desk-top electronic calculator.

2. Description of the Prior Art

In the conventional numerical display system for the electronic calculator, display for fractions has been effected in such a manner that demoninator and numerator are individually displayed with discrete timings and they could not be displayed at the same time. Therefore, no symbol of distinction needed to be displayed between denominator and numerator.

SUMMARY OF THE INVENTION

The present invention intends to provide a display system for a desk-top electronic calculator whereby the denominator and numerator of any fraction and the symbol of distinction therebetween may all be displayed at one time to thereby reduce the possibility of malfunctioning and make the display more legible.

According to the present invention, the numerical display system comprises a multi-digit numerical display device for selectively energizing a plurality of segments to display alphanumeric characters, first drive means for causing said numerical display device to display a denominator and a numerator at one time, and second drive means for causing a denominator-numerator distinction symbol to be displayed between said denominator and said numerator by the selective energization of said plurality of segments.

The invention will become more fully apparent from the following detailed description thereof taken in conjunction with the accompanying drawings.

DESCRIPTION OF THE PREFERRED EMBODIMENT

Figure 1:
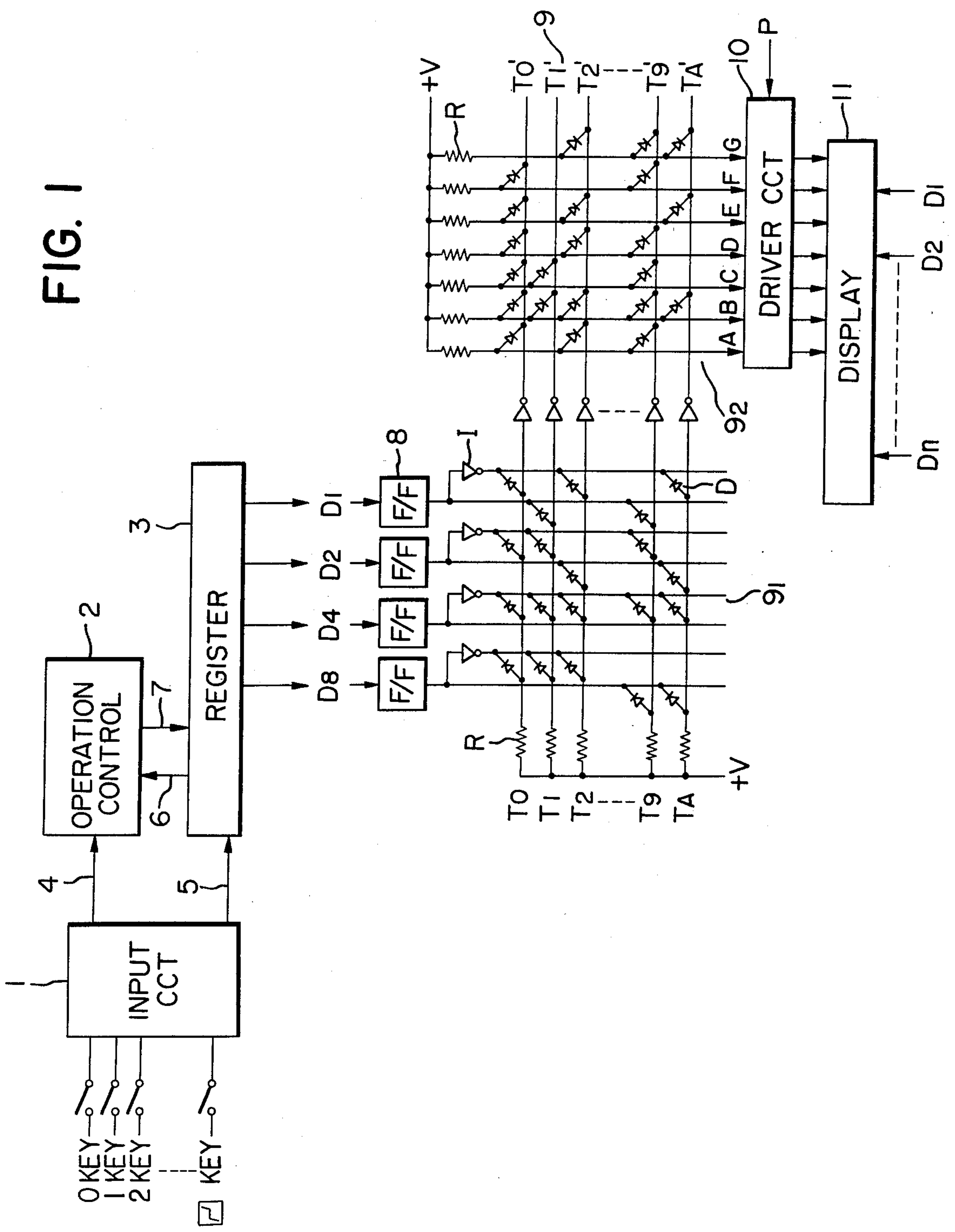
FIG. 1 is a block diagram of an embodiment of the present invention.

Referring to FIG. 1 which shows an embodiment of the present invention, key signals entered into an input circuit 1 from numeric keys, denominator-numerator distinction symbol key

Figure 2:
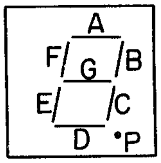
FIG. 2 shows an example of a digit in the display device used with the present invention.
Figure 3:
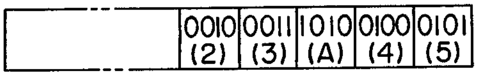
FIG. 3 shows an example of the manner in which numerical values are stored in the register.
Figure 4:
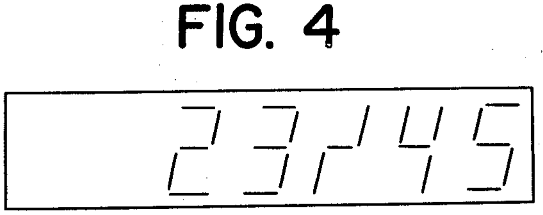
FIGS. 4 and 5 show examples of the display according to the present invention.

, etc. may be coded in the input circuit, from which the coded signals may be stored in a register 3 under the control of an operation control section 2. The contents of the register 3 may in turn be stored in flip-flops 8 digit by digit. A code converter circuit 9 is provided which comprises a binary-decimal decoder $9_1$ and a decimal-binary encoder $9_2$. There is further seen a 7-segment driver circuit 10 and a multi-digit numerical display device 11 which comprises seven segments and a decimal point segment per digit, as shown in FIG. 2. The multi-digit numerical display device 11 may be dynamically driven in a time-division fashion by digit pulses $D_1$–$D_n$. When key inputs are entered from the keyboard in the order of, for example,

, they are stored in the register 3 in the manner as shown in FIG. 3, and displayed under the conventional dynamic display control in the fashion as shown in FIG. 4. Thus, the display system of the present invention makes the display of $$\frac{23}{45}$$

or any other fraction very legible by a simple construction in which the numerical dynamic display mechanism is additionally provided with a denominator-numerator distinction encoding section (

key encoding section and decoder section TA or the like).

Figure 5:
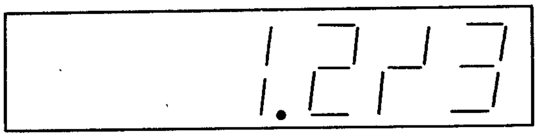

FIG. 5 shows another example of display, in which $$\frac{1.2}{3} \text{ or } 1\frac{2}{3}$$

is displayed. The denominator-numerator distinction symbol may economically utilize the segments (B), (G) and (E) of the character pattern "8", but it will be apparent that the slant segments of the  pattern may also be used specially.

The aforementioned order of key inputs is similar to the usual order of numeric inputs and display and therefore, the operation control circuit 2 may be of the conventional type. However, some difference in custom would give rise to a case where it is desired to display 25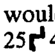45 by effecting key inputs in the order of

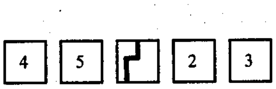

and it will also be apparent that such desire may readily be met simply be adding a control section for causing interchange between the location for storing the denominator and the location for storing the numerator to occur in the register 3 as soon as the control circuit 2 detects the depression of the

key.

What we claim is:

1. A numerical display system for an electronic calculator comprising:

a multi-digit numerical display means having a plurality of display cells each of which includes seven segments forming the shape of the Arabic figure eight and representative of one digit;

register means for applying numerical information and non-numerical information to said multi-digit numerical display device;

input means for entering said numerical information and said non-numerical information to said register means; and control means responsive to the output from said input means for causing said register means to store said numerical information and said non-numerical information, and for causing said display device to display said numerical and non-numerical information in such a manner that said non-numerical information is displayed between a numerator quantity and a denominator quantity, and at a desired digit position of said display device in association with said numerator and denominator quantities, said non-numerical information representation having given by at least two segments of the associated display cell.

2. A numerical display system according to claim 1, wherein said input means includes numerical keys and a non-numerical key.

3. A numerical display system according to claim 1, whererin said non-numerical information is displayed by the upper right hand vertical segment, the lower left hand vertical segment and the middle horizontal segment.

4. A numerical display system according to claim 1, wherein said control means controls said register means in manner to apply the content of said register to said display device every one digit so that said display device is dynamically displayed.

5. A numerical display system according to claim 1, wherein each of said display cells further includes a decimal point segment, and said numerical information comprises a numeral including a decimal point.

6. A numerical display system according to claim 1, wherein each of said display cells further includes a decimal point segment, and said numerical information includes a mixed number.

7. A numerical display system for an electronic calculator comprising:

key input means including numerical keys and a non-numerical key;

register means responsive to the operation of said numerical keys and said non-numerical key for storing input data in accordance with the order of the key operation;

a circuit coupled to the output of said register means for storing one digit content of said register means;

a code converter circuit coupled to said circuit including a first converter section for converting binary information to visual numerical information, and a second converter section for converting binary information to visual non-numerical information; and a multi-digit numerical display means coupled to said code converter circuit and having a plurality of display cells each of which includes seven segments forming the shape of the Arabic figure eight and representative of one digit, whereby said non-numerical information is displayed between a numerator quantity and a donominator quantity, and in a desired digit position of said display device in association with said numerator and denominator quantities responsive to key operation, said non-numerical information representation being given by at least two segments of the display cell.

* * * * *